Figure 1:
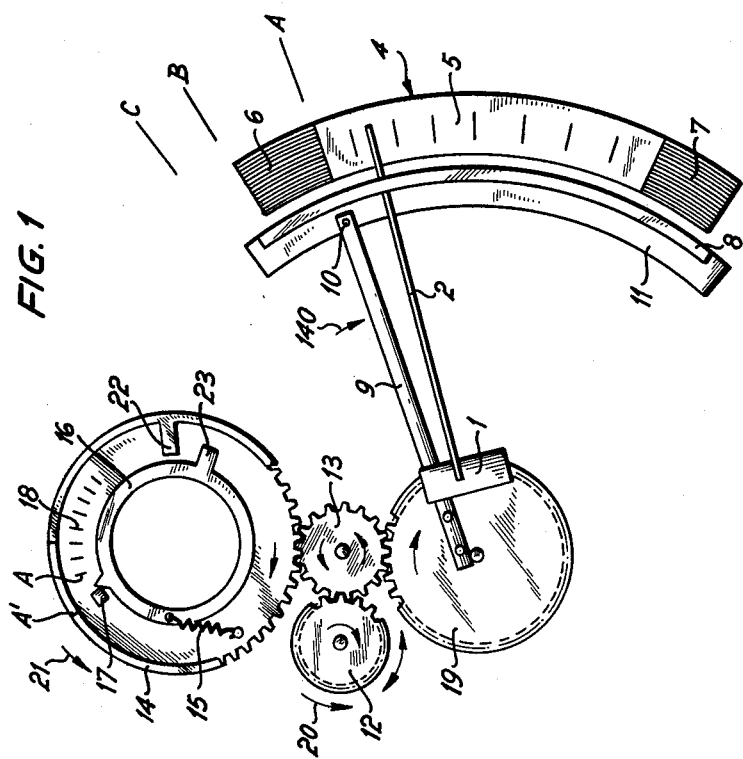

INVENTORS
WALTER SWAROFSKY
FRITZ RENNEBERG

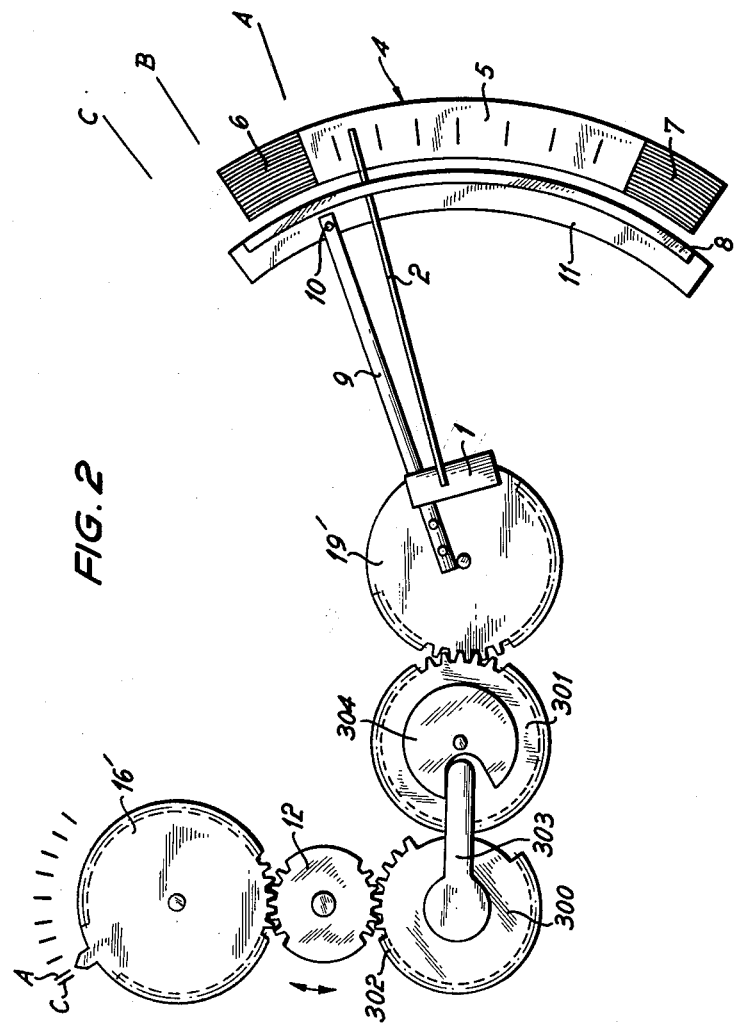

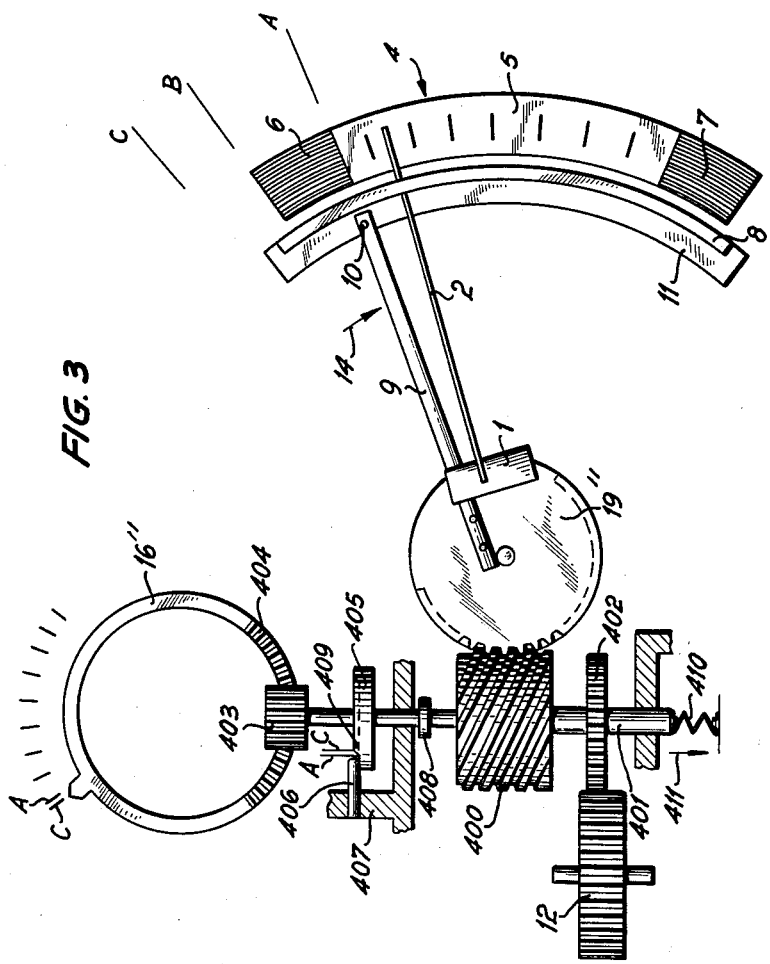

3,076,394
PHOTOGRAPHIC CAMERA WITH SCANNER FOR EXPOSURE METER INDICATOR
Walter Swarofsky and Fritz Renneberg, Braunschweig, Germany, assignors to Voigtländer A.G., Braunschweig, Germany, a corporation of Germany
Filed Nov. 1, 1961, Ser. No. 149,386
Claims priority, application Germany Dec. 3, 1960
12 Claims. (Cl. 95—10)

This invention relates to photographic cameras equipped with exposure meters and with means for scanning the position of the indicator of the exposure meter, for automatic setting of an exposure factor such as, for example, the diaphragm aperture of the objective lens of the camera. More particularly, the present invention is directed to an improved photographic camera of this type having novel means obviating certain difficulties encountered with prior art arrangements.

In photographic cameras of the mentioned type, it is known to provide an indicator having a range substantially in excess of the adjusting range of the setting device for the exposure factor which is to be automatically controlled. It is further known, in such a case, to provide a scale for the indicator including an intermediate range corresponding to the range of regulation of the exposure factor setting device and with end ranges, usually of a different color or different appearance from the intermediate range, and disposed beyond the range corresponding to the regulating range of the exposure factor setting device. Thus, the photographer is apprised, when the indicator is positioned in one of the end ranges, that the available lighting conditions are not such as to permit a successful photographic exposure.

Known types of scanning arrangements are generally not free from play, so that, in reverse directions of travel of the drive for the scanning means, differences occur between the indicated and scanned theoretical diaphragm position and the actual setting of the diaphragm, or other exposure factor setting device.

Where sensitive instruments are used, these must be designed to provide that the indicator of the moving coil instrument can move outside of the scale range corresponding to the exposure factor regulating range, and into a different end range of the scale without being impeded by the scanning means. This means that the initial position for the scanning means must be not only outside that portion of the range corresponding to the regulation range of the exposure factor setter but also outside of the end ranges which, in turn, are outside the regulating range of the setter. Due to the play between the drive elements for the scanning device, the movement of the scanning means or device does not correspond exactly to the movement of the diaphragm, for example, and the scanning device does not attain a position wherein the diaphragm of the objective lens is set at as fully open a value as indicated by the indicator of the exposure meter. These conditions are accentuated by the fact that, in the case of a rigid and immovable coupling between the exposure factor setting device and its associated scanning means, the scanning means will, in all positions of the setting device, remain within the deflecting range of the exposure meter indicator.

It is therefore not possible, in the case of cameras provided with this scanning arrangements, to provide diaphragm aperture adjusting arrangements in which the movement of the diaphragm setting device will correspond exactly to the movement of the scanning device and in which the scanning device can nevertheless be moved out of the range of movement of the exposure meter indicator.

In accordance with the present invention, a camera of the aforementioned type is provided in which the drive between the scanning device and the diaphragm aperture setting device incorporates means providing for movement of the scanning device not only through a range corresponding to the movement of the diaphragm setting device, and in exact accordance therewith, but also through an additional range to an initial position outside the range of deflection of the exposure meter indicator. The diaphragm setting device does not take part in this additional movement of the scanning device outside the range of deflection of the exposure meter indicator, but is arrested at either limit of its motion.

For an understanding of the principles of the invention, reference is made to the following description of typical embodiments thereof as illustrated in the accompanying drawings. In the drawings:

FIG. 1 is a somewhat schematic and diagrammatic view illustrating all of the essential components of one embodiment of the invention; and FIGS. 2 and 3 are views similar to FIG. 1 illustrating other embodiments of the invention.

Referring to FIG. 1, the moving coil instrument 1 of an exposure meter built into a photographic camera is illustrated as having an indicator 2 movable over a scale 4 which is divided into a central portion 5, corresponding to the range of adjustment of an exposure factor setting device, such as the diaphragm aperture setting device, and end ranges 6 and 7 which preferably have different appearances or are shaded or colored differently from the center section 5 so as to be readily distinguishable therefrom. When indicator 2 is in either of the scale fields 6 or 7, it indicates to the photographer that the lighting conditions are such that it is not possible to take an acceptable exposure.

When the camera shutter is released, in a known manner, the indicator 2 is clamped in its then indicating position by means of a clamping element 8, also of a known construction. The scanning mechanism is then operable so that the scanning element or device 9 follows up indicator 2, in a known manner, until a stop 10 on the element 9 engages indicator 2. Element 9 is then locked in the scanning position, against a locking surface 11 cooperable with element 9.

Scanning element 9 is driven by a preferably spring powered source 12 through the medium of gears 13 and 19 so that it moves in the direction of the arrow 140 upon release of the camera shutter, this movement continuing until stop 10 engages indicator 2 and scanning element 9 is locked against surface 11. Gear 13 also meshes with intermediate ring 14 formed as a spur gear substantially coaxial with a diaphragm aperture setting ring 16.

Rings 14 and 16 are interconnected by a tension spring 15 so that, when ring 14 is turned counterclockwise, ring 16 will also be turned counterclockwise until its further motion is barred by a stop 17, whose position is generally determined by the structural arrangement of the diaphragm blades. This is the fully open diaphragm position. Movement of diaphragm setting ring 16 to the diaphragm closed position is effected by cooperating stops 22 and 23 on rings 14 and 16, respectively, which, when ring 14 is rotated in a clockwise direction, form a rigid or solid drive for ring 16.

In the case of standard objective lenses, stop 17 is positioned about one-half a diaphragm stage beyond the full open position of the diaphragm. In such standard objectives, the openings of the retaining rings supporting the lenses of the objective are so designed that they correspond to the full diaphragm opening available, so that the diaphragm setting ring is actually movable to a position beyond the point where the diaphragm has its full opening or maximum aperture, while the aperture of the diaphragm at such full opening corresponds to the openings of the retaining rings.

Owing to the provision of spring 15 interconnecting ring 14 and diaphragm setting ring 16, ring 14 may move counterclockwise even though diaphragm setting ring 16 has had its counter-clockwise rotation arrested by stop 17. During such further movement of ring 14, Spring 15 is expanded.

The arrangement of FIG. 1 operates as follows: In the zero position, scanning element 9 is positioned outside of the full range of scale 4, and substantially in the position C. The indicator 2, in its zero position, is in a substantially obscure position at the lower end of scale 4, and substantially at the position B which is one limit of scale 4. In this position of the parts, diaphragm setting ring 16 is at the position A which, for the sake of clarity, is also indicated with reference to the diaphragm setting scale 18. In other words, diaphragm setting ring 16 is in the position where the diaphragm is fully open, while the intermediate ring 14 is further shifted, relative to the diaphragm setting ring 16 and with the spring 15 under tension, by an amount corresponding to the distance B—A. This amount is in addition to any play existing in the gears 13 and 19. This additionally displaced position of ring 14, with respect to the zero position, is indicated by the position A' on ring 14. If the position of intermediate ring 14 should correspond to the position of the scanning indicator or element 9 at position A, then points A' and A would coincide.

If the exposure meter is now exposed to light for the purpose of preparing to take an exposure, indicator 2 will move to a definite indication position on diaphragm scale 5. The first effect following release of the shutter is the locking of indicator 2 in its then indicating position by virtue of clamping means 8. Thereupon, scanning element 9 is moved by power drive 12, through gearing 13 and 19, in the direction of movement of indicator 2. This further results in simultaneous rotation of ring 14 for setting of the diaphragm through rotation of setting ring 16.

Initially, rotation of intermediate ring 14 does not result in rotation of ring 16, but only results in contraction of spring 15 during a rotational displacement of ring 14 sufficient for stops 22 and 23 to become engaged. At this time, the point A' on the intermediate ring 14 comes into coincidence with point A corresponding to the full opening of the diaphragm aperture. During this movement, indicator element 9 is moved from its zero position C through position B into position A so that, upon further rotation of gear 13 by drive 12, diaphragm setting ring 16 moves in coordination with indicator element 9 until stop 10 on the latter engages indicator 2. The diaphragm aperture is then set in accordance with the indication of scanning element 9.

Upon reverse movement of power drive 12, which is preferably effected responsive to actuation of the film feed mechanism, and which reverse motion is indicated by the arrow 20, scanning element 9 remains in its scanning position until such time as the play in the gearing has been taken up, while intermediate ring 14 is moved. When diaphragm setting ring 16 has reached the position A corresponding to the full diaphragm opening, scanning element 9 would then be at such a distance short of position A as would correspond to the play of the gearing. In this position, mark A' on intermediate ring 14 will coincide with mark A on the diaphragm scale. Upon further operation of gearing 13 and 19 by means of power drive 12 in the direction of arrow 20, indicator 9 is brought to position C, while further rotation of diaphragm setting ring 16 is arrested by fixed stop 17. Thus, intermediate ring 14 can rotate a further distance in the direction of arrow 21, with stops 22 and 23 disengaging each other and spring 15 being expanded. The intermediate ring 14 is so rotated a sufficient amount for scanning element 9 to be restored to its initial position C.

The described arrangement makes it possible, in objective lenses wherein the movement of the diaphragm setting device is limited to the range of the maximum diaphragm opening, to provide, for the scanning element, an additional adjustment beyond this range corresponding to the maximum aperture of the diaphragm plus a further movement equal to that necessary to take up the play in the driving gear for the scanning element and to move the scanning element to an initial position outside the range of movement of the indicator 2. Furthermore, there is at all times a completely adequate coupling between intermediate ring 14 and diaphragm setting ring 16, through the medium of the spring 15, for adjusting the object lens diaphragm.

In the embodiment of the invention illustrated in FIG. 2, parts identical with those of the embodiment of the invention illustrated in FIG. 1 have been given the same reference character and parts corresponding to the same parts as in FIG. 1 have been given the same reference character primed. In this embodiment of the invention, the diaphragm aperture setting ring 16' is formed as a spur gear which meshes directly with the power drive 12, and the latter also drives the partial gear 19' corresponding to the scanning drive gear 19 of FIG. 1. The connection between the power drive 12 and the gear 19' is effected by a gear arrangement 300, 301 of such a nature that variable gear ratios come into effect during the course of travel of the indicator element 9 along its path of movement.

While a specific arrangement for varying the gear ratio is illustrated in FIG. 2, it should be understood that this is by way of example only and that a variable gear ratio may be effected in other ways. The gear 300 has a segment 302 formed as a gear but extending through less than the entire periphery of the gear 300. Gear segment or sector 302 meshes with spur gear 301 when scanning element 9 is positioned in the range 5 of the scale 4 corresponding to the effective adjustment range of diaphragm setting ring 16'. Gear 301 meshes with the scanning gear 19' carrying the indicator element 9.

Over an arc corresponding to the A—C range of scanning element 9, the gearing of gear 300 is interrupted. In this range or movement, a lever 303 secured to move with gear 300 projects radially across gear 301 to an extent such as to engage within a recess of a cam plate 304 secured to move with gear 301. The length of lever 303 is substantially greater than the crown line radius of gear 300 so that, when lever 303 is engaged with cam plate 304, the range of rotation of gear 301 for a given range of movement of power drive 12 is substantially greater than the range of movement of gear 301 would be if sector gear 302 were meshing with spur gear 301. The relative extent of sector gear 302, and the relative length of lever 303, as well as their relative disposition, are so selected that one of these coupling means is always operative on the spur gear 301 when the other is inoperative thereon. Owing to the variable gear ratio, a relatively short angular movement A—C of the diaphragm setting ring 16', as indicated in the upper left hand portion of FIG. 2, corresponds to a much greater angular displacement A—C of scanning element 9 through the field 6 of scale 4.

The manner of operation of the arrangement shown in FIG. 2 is identical with that of the arrangement shown in FIG. 1 insofar as cooperation between indicator 2 and scanning element 9 is concerned. However, in the arrangement of FIG. 2, the compensation for the movement of indicator 2 into the range B—A of the scale 4, and for movement of the scanning element 9 to the position C, as well as that for accommodating the play developed in the scanning drive, is effected by the variable gear ratio. Actually, the movement of the scanning element 9 from the position A to the position C, as well as the necessary take-up in the play of the scanning drive, corresponds to a much shorter movement A—C of diaphragm setting ring 16', as will appear from the upper left hand portion of FIG. 2. As a matter of fact, the dimensions of the individual components of the drive can be so selected that this very small range A—C is within the range of movement of the diaphragm setting ring 16' in moving to its fully closed or fully open position, and thus the arrangement is applicable to the case of objective lenses in which the diaphragm setting ring does not have an increment of motion beyond the position corresponding to the full diaphragm aperture.

FIG. 3 illustrates another embodiment of the invention which, in its basic concept, is similar to that of the design shown in FIG. 2. In FIG. 3, parts identical with those shown in FIG. 1 have been given the same reference character, and parts corresponding in function to those shown in FIG. 1 have been given the same reference character double primed. The essential difference between the embodiments of FIG. 3 and that of FIG. 2 is that, in the embodiment of FIG. 3, the conversion of the relatively long range of movement A—C of the scanning element 9 into a much shorter range of movement A—C of the diaphragm setting ring 16" is effected by longitudinal or axial displacement of an element of the drive for the scanning element 9.

Referring to FIG. 3, this axially displaceable component comprises a worm 400 secured to a shaft 401 to which is fixed a spur gear 402 meshing with the power drive 12. A spur gear 403, fixed to the opposite end of the shaft 401, meshes with a segmental gear 404 on the periphery of the diaphragm setting ring 16" and extending through only a relatively small arc of the periphery. A cam plate 405 is secured to the shaft 401 inwardly of the spur gear 403 and cooperates with a bolt or pin 406 mounted fixedly in a portion 407 of the camera housing. Below this portion 407, a collar 408 is secured to the shaft 401 and is biased to engage the housing portion 407 by a spring 410 acting to move the shaft 401 upwardly as viewed in FIG. 3.

Worm 400 engages a worm gear 19" on which is mounted the scanning element 9. Thus, upon rotation of power drive 12, shaft 401 will be rotated thus rotating diaphragm setting ring 16" and, through worm 400 and worm gear 19", moving scanning element 9 to follow indicator 2 until stop 10 of element 9 engages this indicator, the direction of movement being indicated by the arrow 14. In the set or pre-exposure position of the parts, element 9 is at the position C and the indicator of ring 16" is at its associated position C shown in the upper left hand corner of FIG. 3. In this position, pin 406, riding up the circumferentially small sloping portion 409 of cam 405 will have moved shaft 401 downwardly against the bias of spring 410, and in the direction of the arrow 411. This, in turn, rotates worm gear 19" through an amount sufficient to move scanning element 9 from the position A, at the right of FIG. 2, to the position C. Due to the very short circumferential extent A—C of the cam portion 409, diaphragm setting ring 16" will have been moved only the very short angular distance A—C.

Upon release of the shutter, power drive 12 starts to operate to rotate shaft 401. During an initial very small increment of angular movement of shaft 401, pin 406 rides down cam portion 409 of cam 405, as the latter is moved slightly angularly and, as a result, not only is diaphragm setting ring 16" moved through a very small angular distance C—A but also scanning element 9 is moved through the much larger angular range C—A in the direction of the arrow 14. This not only compensates for all play in the drive of the scanning mechanism but also brings element 9 to the start of "active" portion 5 of scale 4 of indicator 2. The arrangement then operates in the manner previously described, with the position of element 9 corresponding always exactly to the setting of ring 16".

It will be noted that the pitch of sloping cam portion 409 determines the travel path of the scanning element 9, and therefore the letters A and C have been illustrated on this cam to coordinate the illustration. In addition, there is a very high gear ratio between gear 403 and gear sector 404, so that the movement of diaphragm setting ring 16" is very small. This arrangement is therefore also particularly adapted for use in objective lenses wherein there is only a very slight increment of movement of the diaphragm setting ring beyond the fully open position of the diaphragm, or in which there is no increment of movement thereof beyond the fully open position of the diaphragm.

While specific embodiments of the invention have been shown and described in some detail to illustrate the application of the principles of the invention, it will be understood that the invention may be embodied otherwise without departing from such principles.

What is claimed is:

1. In a photographic camera including an exposure meter having an indicator movable through a predetermined deflection range, a scanning element movable through the deflection range to scan the indicating position of the indicator, and an exposure factor setting means coupled to the scanning element for movement therewith, the exposure factor setting means being movable only through a pre-set range of exposure factor values not in excess of the deflection range of the indicator; means for moving said scanning element through a range in excess of said deflection range to an initial position outside said deflection range, said means comprising, in combination, driving mechanism interconnecting said setting means and said scanning element; power drive means operable, upon initiation of an exposure, to operate said driving mechanism to move said scanning element through said deflection range to scan the indicating position of said indicator, and simultaneously to move said exposure factor setting means to set the exposure factor in accordance with the scanning position of said scanning element; and a driving component included in said driving mechanism and normally having an effective driving relation with said setting means, said component being effective, during movement of said scanning element through said deflection range and during movement of said setting means within its pre-set range, to maintain a rigid driving connection between said setting means and said scanning element for conjoint synchronized movement thereof; said component, when said setting means reaches substantially the limit of its pre-set range in the direction of said initial position of said scanning element, being displaced out of said normal effective driving engagement with said setting means to provide for further movement of said scanning element beyond said deflection range to said initial position.

2. In a photographic camera as claimed in claim 1, said exposure factor setting device comprising a diaphragm aperture setting device for the diaphragm of the objective lens of the camera; said range of exposure factor values comprising the range of diaphragm aperture settings between the fully open and fully closed positions of the diaphragm.

3. In a photographic camera as claimed in claim 1, in which said driving component comprises a pair of coaxial relatively rotatable rings, one of which is rigidly connected to said setting means and the other of which is rigidly coupled to said scanning element; and spring means interconnecting said rings for conjoint rotation and constituting a lost motion connection therebetween.

4. In a photographic camera as claimed in claim 1, in which said driving mechanism comprises gearing including a spur gear rigidly coupled for movement with said setting means and continuously in driving engagement with a second spur gear; and means operable to vary the gear ratio between said first and second spur gears at such limit of said pre-set range in the direction of movement of said initial position of said scanning element.

5. In a photographic camera as claimed in claim 1, said driving mechanism comprising gearing including intermeshing gear components one of which is said driving component, one of said gear components being bodily displaceable relative to said setting means when the latter is at the limit of its pre-set range in the direction of said initial position of said scanning element.

6. In a photographic camera as claimed in claim 5, said gear components including a worm drivingly connected to said setting means and meshing with a worm gear connected to said scanning element; said worm gear being axially displaced at such limit of the pre-set range of movement of said setting means in the direction of said initial position of said scanning element.

7. In a photographic camera as claimed in claim 2, said diaphragm setting device comprising a ring and said component comprising an intermediate ring coaxial with said diaphragm setting ring and rotatable relative thereto, and constituting said component cooperating abutment means on said diaphragm setting ring and as said intermediate ring interengageable upon rotation of said intermediate ring in a direction toward the closed position of said diaphragm to positively drive said setting ring toward said diaphragm toward its closed position; spring means connected between said setting ring and said intermediate ring and biasing said setting ring to follow said intermediate ring during movement of said intermediate ring toward the fully open position of said diaphragm; and stop means engageable with said diaphragm setting means at the limit of movement of the latter in the diaphragm opening direction; said spring means being expansible to provide for continued movement of said intermediate ring after movement of said diaphragm setting ring in the diaphragm closing direction has been arrested by said stop means.

8. In a photographic camera as claimed in claim 7, driving components maintaining a rigid driving connection between said intermediate ring and said scanning element.

9. In a photographic camera as claimed in claim 7, said diaphragm setting ring and said intermediate ring being mounted in coaxial relatively rotatable relation in the objective mount of the camera.

10. In a photographic camera as claimed in claim 8, said diaphragm setting ring and said intermediate ring being mounted in coaxial relatively rotatable relation in the objective mount of the camera.

11. In a photographic camera as claimed in claim 1, said exposure factor setting means comprising a rotatable diaphragm aperture setting ring having gear teeth on its periphery; said component comprising a spur gear having gear teeth throughout the major part of its periphery but omitted over a relatively small arcuate extent thereof to leave an arcuate gap; said power driving means meshing with said setting ring and said spur gear; a second spur gear in continuous driving engagement with said scanning element; said first spur gear meshing with said second spur gear throughout substantially the full extent of movement of said second ring; said first spur gear having its teeth disengaged from the teeth of said second spur gear during that portion of the movement of the scanning element beyond the pre-set range of said setting ring toward the initial position of said scanning element; a lever fixed to rotate with said first spur gear and extending radially therebeyond and substantially bisecting said arcuate gap of said first spur gear, the length of said lever being greater than the crown line radius of the gear teeth of said first spur gear; and a cam fixed to rotate with said second spur gear and engageably cooperable with said lever during that portion of the travel of said scanning element beyond the pre-set range of said setting ring in the direction of the initial position of said scanning element; whereby, during a relatively very small angular movement of said setting ring adjacent the limit of its pre-set range of movement toward the initial position of said scanning element, said scanning element is driven through a relatively large angular movement to its initial position.

12. In a photographic camera as claimed in claim 1, said setting device comprising a rotatable diaphragm aperture setting ring; a shaft rotatably mounted in the camera casing and having limited axial displacement therein; said power drive means being operable to rotate said shaft; said driving mechanism including means on said shaft operable to rotate said setting ring; a worm fixed to rotate with said shaft; a worm gear meshing with said worm and rigidly coupled to said scanning element; a substantially circular face cam secured to rotate with said shaft; a pin fixed in the camera casing and engageable with said face cam during rotation of said shaft; said face cam having a sharply inclined portion of small circumferential extent engageable with said pin when said setting ring is adjacent its limit of movement in the direction of the initial position of said scanning element whereby, as said pin engages said sharply inclined portion through a very small angular displacement of said shaft, said shaft is shifted axially to displace said worm axially to rotate said worm gear to move said scanning element through a relatively wide angle very much greater than the angle of movement of said setting ring.

References Cited in the file of this patent
UNITED STATES PATENTS

| | | |
|---|---|---|
| 2,913,969 | Faulhaber | Nov. 24, 1959 |
| 2,920,542 | Engelsmann | Jan. 12, 1960 |
| 2,928,323 | Steisslinger | Mar. 15, 1960 |
| 2,960,921 | Greger | Nov. 22, 1960 |